United States Patent
Teguri (10) Patent No.: US 9,711,172 B1
(45) Date of Patent: Jul. 18, 2017

(54) MAGNETIC RECORDING DEVICE AND READING METHOD

(71) Applicant: Kabushiki Kaisha Toshiba, Minato-ku, Tokyo (JP)

(72) Inventor: Hironori Teguri, Yamato Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/087,252

(22) Filed: Mar. 31, 2016

(30) Foreign Application Priority Data

Jan. 8, 2016 (JP) ................................. 2016-002648

(51) Int. Cl.
- *G11B 5/09* (2006.01)
- *G11B 5/58* (2006.01)
- *G11B 5/596* (2006.01)
- *G11B 20/12* (2006.01)
- *G11B 5/00* (2006.01)

(52) U.S. Cl.
CPC ...... *G11B 5/59627* (2013.01); *G11B 20/1217* (2013.01); *G11B 2005/0021* (2013.01); *G11B 2020/1238* (2013.01); *G11B 2020/1292* (2013.01)

(58) Field of Classification Search
CPC ............ G11B 20/1217; G11B 5/59638; G11B 5/59655; G11B 5/607; G11B 5/012; G11B 5/59633; G11B 5/59661; G11B 5/6011; G11B 21/21; G11B 2005/0024; G11B 2020/1281; G11B 2020/1284; G11B 2220/2516
USPC ... 360/75, 72.1, 77.01, 77.05, 77.06, 25, 39, 360/31, 67
See application file for complete search history.

(56) References Cited

U.S. PATENT DOCUMENTS

| | | | |
|---|---|---|---|
| 7,746,593 B2 | 6/2010 | Sudo | |
| 8,264,918 B2 | 9/2012 | Hashimoto et al. | |
| 9,082,418 B2 * | 7/2015 | Ong | G11B 5/012 |
| 2010/0033865 A1 | 2/2010 | Hashimoto et al. | |

FOREIGN PATENT DOCUMENTS

| | | |
|---|---|---|
| JP | 2008-159125 A | 7/2008 |
| JP | 2009-187617 A | 8/2009 |

* cited by examiner

*Primary Examiner* — Nabil Hindi
(74) *Attorney, Agent, or Firm* — White & Case LLP (57) ABSTRACT

According to one embodiment, a magnetic disk device includes a disk including a tracks including a servo region, a light irradiator configured to irradiate the disk with light and heat the disk with the light, a head including a write head configured to write data in a range irradiated and heated with the light, and a read head configured to read data from the tracks, a controller configured to write first data to be used for offset detection in a first region of the tracks, read the first data from the first region with reference to servo data in the servo region, detect an offset of the read head based on an amplitude of a first signal of the first data, and control a position of the read head based on the offset.

6 Claims, 9 Drawing Sheets

MAGNETIC RECORDING DEVICE AND READING METHOD

CROSS-REFERENCE TO RELATED APPLICATIONS

This application is based upon and claims the benefit of priority from Japanese Patent Application No. 2016-002648, filed Jan. 8, 2016, the entire contents of which are incorporated herein by reference.

FIELD

Embodiments described herein relate generally to a magnetic recording apparatus and a reading method.

BACKGROUND

Recently, various techniques of realizing a high-capacity magnetic recording device (such as an HOD) have been developed. One of the techniques is a recording technique called shingled magnetic recording (SNR) or shingled write recording (SWR). A magnetic recording device adopting the shingled magnetic recording technique is configured, when writing data to a magnetic disk, to write a recording track in such a manner as to partially overlap with the adjacent track. The shingled magnetic recording technique allows an HDD to achieve a higher track density (tracks per inch [TPI]).

Further, there is a recording technique called thermally assisted magnetic recording (TAMR). A magnetic recording device adopting the thermally assisted magnetic recording technique (hereinafter referred to as a thermally assisted magnetic recording device) comprises a light irradiator configured to irradiate a recording layer of a magnetic disk with light (such as near-field light) and a waveguide which transmits light (such as a laser beam) to the light irradiator. According to this magnetic recording device, it is possible to achieve high density recording by irradiating, when writing data, the recording layer of the recording medium with light from the tip of the light irradiator, locally heating the recording layer, and sufficiently lowering the coercivity of the heated portion of the recording layer.

In the thermally assisted magnetic recording device, when the irradiation range of irradiation light changes, the recording width of the write head changes, accordingly.

DETAILED DESCRIPTION

In general, according to one embodiment, a magnetic recording device comprises: a disk comprising a band of tracks including a servo region, a first track, and a second track partially overlapping with the first track; a light irradiator configured to irradiate the disk with light and heat the disk with the light; a head comprising a write head configured to write data in a range of the disk irradiated and heated with the light from the light irradiator, and a read head configured to read data from a track in the band of tracks of the disk; a controller configured to write first data to be used for offset detection in a first region of the band of tracks, reads the first data from the first region with reference to servo data in the servo region, detects an offset of the read head based on an amplitude of a first signal of the read first data, and control a position of the read head based on the offset.

Embodiments will be described hereinafter with reference to the accompanying drawings.

Embodiment

Figure 1:
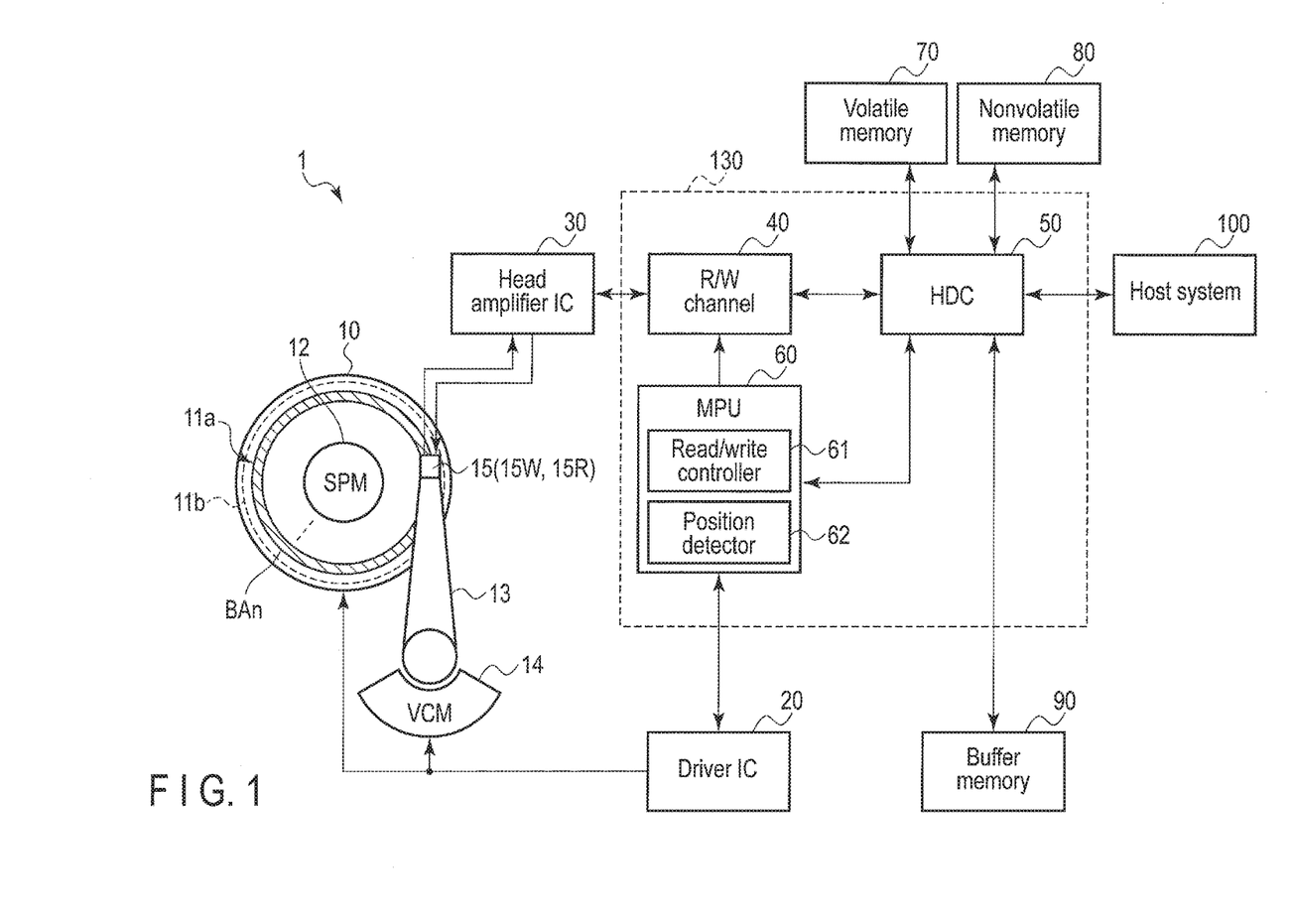
FIG. 1 is a block diagram showing the structure of a magnetic recording device of an embodiment.

FIG. 1 is a block diagram showing the structure of a magnetic recording device 1 of the present embodiment.

The magnetic recording device 1 comprises a head-disk assembly (HDA), which will be described later, a driver IC 20, a head amplifier integrated circuit (hereinafter, a head amplifier IC) 30, a volatile memory 70, a nonvolatile memory 80, a buffer memory (butter) 90, a system controller 130 consisting of a single chip integrated circuit. Further, the magnetic recording device 1 may be connected to a host system (host) 100.

The HDA comprises a magnetic disk (hereinafter, a disk) 10, a spindle motor (SPM) 12, an arm 13 provided with a head 15, a voice coil motor (VCM) 14. The disk 10 is rotated by the spindle motor 12. The arm 13 and the VCM 14 constitute an actuator. The actuator is driven by the VCM 14 and is configured to move the head 15 mounted on the arm 13 to a particular position on the disk 10. It is also possible that the HDA comprises two or more disks 10 and heads 15.

The disk 10 comprises a data region, and the data region is assigned with a shingled magnetic recording region (SMR region) 11a and a media cache region 11b. In response to a user data write request from the host 100, the user data is written in the shingled magnetic recording region 11a. The media cache region 11b is used as a cache for the shingled magnetic recording region 11a.

The shingled magnetic recording region 11a is a recording region in which the next track data is written in such a manner as to partially overlap with the adjacent track and which has a track density higher than that of the media cache region 11b. The shingled magnetic recording region 11a comprises a plurality of bands of tracks, each (hereinafter, a band region. BAn) including at least one track (first track) partially overlapping with the adjacent track and the last write track (second track). The second track has a width greater than that of the first track. Band region BAn consists of a band of tracks for one round of the disk 10. In the following description, a trace (track) of the head 15 written in write processing is referred to as a write track, and a region in the write track other than a region overwritten on the adjacent write track in the shingled magnetic recording is referred to as a read track. In the first track in the shingled magnetic recording, the center position (hereinafter, the track center) of a write track does not usually coincide with the track center of a read track. Note that the write and read tracks may also be referred to simply as a track.

The head 15 will be described with reference to FIGS. 2 and 3.

Figure 2:
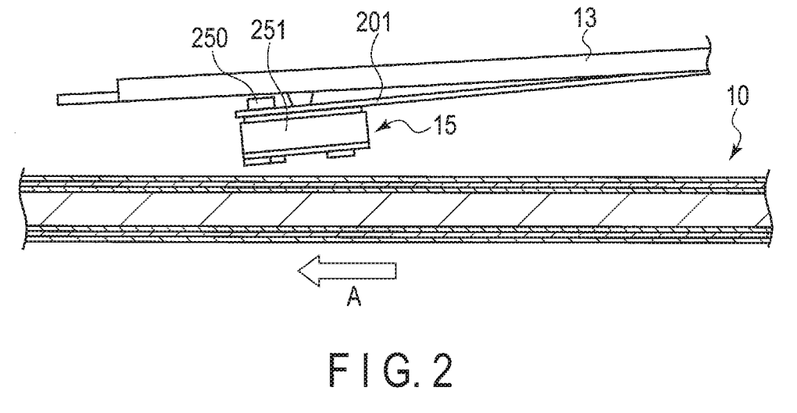
FIG. 2 is an enlarged side view of a head and a magnetic disk of the magnetic recording device of the embodiment.
Figure 3:
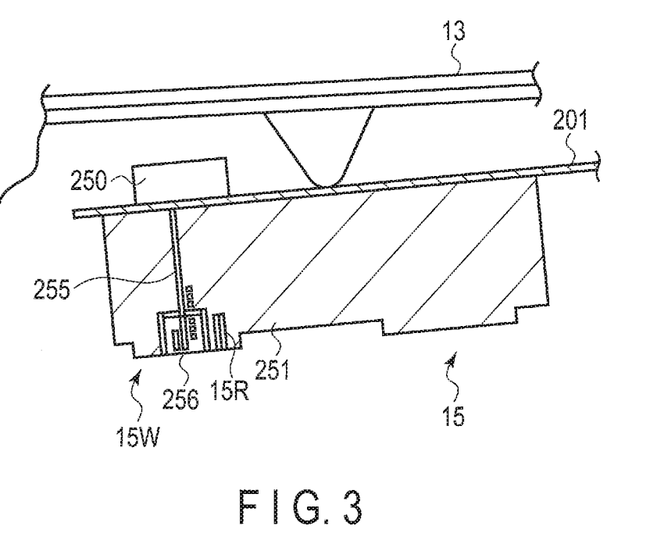
FIG. 3 is a sectional view of the head of the embodiment.

FIG. 2 is an enlarged side view of the head 15 and the magnetic disk 10 of the magnetic recording device of the present embodiment, and FIG. 3 is a sectional view of the head 15 of the present embodiment. FIG. 2 shows the rotation direction A of the disk 10.

The head 15 comprises a slider 251. The slider 251 is secured to a gimbal 201 attached to the arm 13.

The head 15 comprises a write head 15W, a read head 15R, a light generator (for example, a laser diode) 250, a waveguide 255, and a near-field light irradiator (a plasmon generator, a near-field transducer) 256, all being provided in the slider 251.

The read head. 15R reads data wrote in a data track on the disk 10. The write head 15W writes data to the disk 10. The write head 15W generates a magnetic field perpendicular to the surface of the disk 10.

The light generator 250 is a (laser) light source and is provided above the slider 251 or in the gimbal 201. The light generator 250 supplies light to the waveguide 255. Note that the light generator 250 may be provided in a portion other than the slider 251 or the gimbal 201. For example, the light generator 250 may be provided outside the arm 13 and the head 15. The light generated by the light generator 250 is then transmitted by the waveguide 255 to the near-field light irradiator 256.

The near-field light irradiator 256 is provided at the lower end of the slider 251 facing the disk 10. In write processing, the near-field light irradiator 256 generates near-field light from the laser beam transmitted through the waveguide and irradiates the disk 10 with the near-field light. The near-field light is used for heating the recording layer of the disk 10 and for lowering the coercivity of the recording layer of the disk 10. The near-field light irradiator 256 contains a metal member. Note that, instead of the near-field light irradiator 256, a lens which concentrates the light transmitted from the light generator 250 onto the disk 10 may be provided.

In this way, the magnetic recording device 1 can realize high-density magnetic recording in a high-coercive medium, namely, the disk 10 by irradiating the disk 10 with the near-field light generated by the near-field light irradiator 256.

Further, the near-field light irradiator 256 determines a recording width (or a track width) of the write head 15W by the irradiation range of the near-field light (also referred to as a spot range or a thermal distribution range). That is, the recording width corresponds to the irradiation range of the near-field light. For example, the near-field light irradiator 256 determines the width of a write track (hereinafter referred to simply as a write track width) by making the irradiation range of the near-field light smaller than the width of the write head 15W.

For example, when the near-field light irradiator is deformed by the heat generated from the near-field light, the irradiation range of the near-field light changes, and the write track width of the write head 15W changes, accordingly. Further, as the write track width of the write head 15W changes, the width of a particular band region (hereinafter referred to simply as a band width) changes, accordingly.

Figure 4:
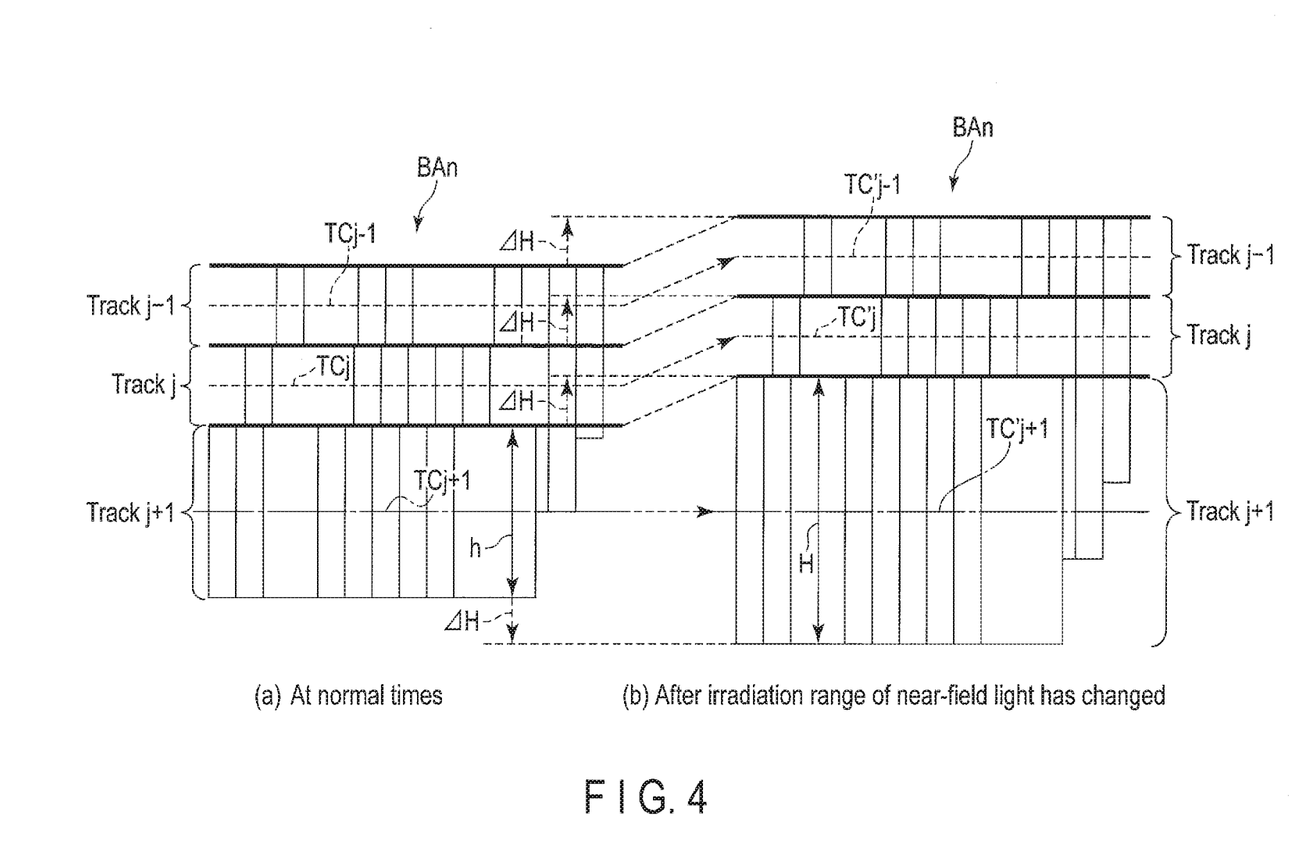
FIG. 4 is a schematic diagram showing a change in a band region BAn associated with a change in an irradiation range of near-field light.

With reference to FIG. 4, a change in band region BAn associated with a change in the irradiation range of the near-field light will be described.

FIG. 4 is a schematic diagram showing a change in band region BAn associated with a change in the irradiation range of the near-field light. In FIG. 4, the left-hand diagram (a) shows a band region BAn written when the irradiation range of the near-field light is of normal times, while the right-hand diagram (b) shows a band region BAn written after the irradiation range of the near-field light has changed. The change in the irradiation range of the near-field light from the left-hand diagram (a) of FIG. 4 to the right-hand diagram (b) of FIG. 4 occurs when the irradiation range of the near-field light increases. Here, normal times are the times, for example, when a change associated with heat or the like has not occurred in the irradiation range of the near-field light yet.

A read track j−1, a read track j, a read track j+1 of the left-hand diagram (a) of FIG. 4 correspond to a read track j−1, a read track j, a read track j+1 of the right-hand diagram (b) of FIG. 4, respectively. In the left- and right-hand diagrams (a), (b) of FIG. 4, read track j−1 and read track j are regions in write tracks other than regions partially overlapping with the adjacent write tracks. Read track j+1 is the track (second track) written in a particular band region BAn at the end.

As shown in the left-hand diagram (a) of FIG. 4, read track j+1 of the write track written by the write head 15W when the irradiation range of the near-field light is of normal times (hereinafter referred to simply as, at normal times) is assumed to have a track width h. As shown in the right-hand diagram (b) of FIG. 4, read track j+1 of the write track written by the write head 15W after the irradiation range of the near-field light has changed (hereinafter referred to simply as, after the change) has a track width H. That is, the write track width is h at normal times, whereas the write track width is H after the change. Further, the difference between the normal write track width and the changed write track width is 2ΔH. Here, a case where the changed irradiation range of the near-field light is greater than the normal irradiation range of the near-field light (H>h) will be described. Note that a read track of a write track written by the write head 15W at normal times will be referred to simply as a normal read track, while a read track of a write track written by the write head 15W after the change will be referred to simply as a changed read track.

As shown in the left-hand diagram (a) of FIG. 4, normal read track j−1 has a track center TCj−1, normal read track j has a track center TCj, and normal read track j+1 has a track center TCj+1. Further, as shown in the right-hand diagram (b) of FIG. 4, changed read track j−1 has a track center TC'j−1, changed read track j has a track center TC'j, and changed read track j+1 has a track center TC'j+1.

In FIG. 4, the track widths of read track j−1 and read track j correspond respectively to the lengths in the cross-track direction of portions other than portions overlapping with the adjacent write tracks, namely, the write tracks of read track j and read track j+1. Before and after the change in the irradiation range, each write track is written by the write head. 15W at the same radial target position relative to the disk 10. In the case of FIG. 4, each write track width is increased by 2ΔH after the change.

However, before and the after the change, the track widths of read track j−1 and read track j remain unchanged. This is because, before and after the change, the radial position of the edge of each write track and the radial position of a portion overlapping with (overwritten on) an adjacent track change, but the center gap between adjacent write tracks (that is, the pitch of a write track) does not change.

Further, when the irradiation range of the near-field light changes, track center TCj−1 of read track j−1 and track center TCj of read track j shift radially in accordance with the changes in the write track widths. For example, as shown in FIG. 4, track center TCj−1 of read track j−1 shifts radially by an offset ΔH in accordance with the change in the write track width, and changes to track center TC'j−1. Still further, track center TCj of read track j shifts radially by the offset ΔH in accordance with the change in the write track width, and changes to track center. TC'j−1.

Track width of read track j+1 changes in accordance with the change in the write track width because no track is further overwritten on read track j+1. For example, as shown in FIG. 4, when normal read track j+1 changes to changed read track j+1, track width h changes to track width H. Further, since the write track is written at the same target position before and after the change, track center TCj and track center TC'j of read track j+1 are located at the same radial position.

As described above, in the changed band region BAn, read track j−1 and read track j are overwritten respectively on the corresponding adjacent write tracks, and thus the track centers shift radially, but the track widths remain unchanged. Further, in the changed band region BAn, since read track j+1 is the write track no track will be further overwritten thereon, the track center does not shift radially, but the track width changes.

A shown in FIG. 1, the driver IC 20 drives the SPM 12 and the VCM 14 under the control of the system controller 130 (more specifically, the MPU 60, which will be described later).

The head amplifier IC 30 comprises a read amplifier and a write driver. The read amplifier is configured to amplify a read signal read by the read head 15R and transmit the signal to a read/write (R/W) channel 40. The write driver is configured to transmit a write current to the write head 15W based on write data output from the ROW channel 40.

The volatile memory 70 is a semiconductor memory which loses stored data when power supply is cut off. The volatile memory 70 stores data necessary for executing processing in various unites of the magnetic recording device 1. The volatile memory 70 is, for example, a synchronous dynamic random access memory (SDRAM).

The nonvolatile memory 80 is a semiconductor memory which maintains stored data even after power supply is cut off. The nonvolatile memory 80 is, for example, a flash read-only memory (FROM).

The buffer memory 90 is a semiconductor memory which temporarily stores data transmitted between the disk 10 and the host 100. Note that the buffer memory 90 may be provided integrally with the nonvolatile memory 70. The buffer memory 90 is, for example, a dynamic random access memory (DRAM), a static random access memory (SRAM), an SDRAM, a ferroelectric random access memory (Fe-RAM), a magnetoresistive random access memory (MRAM) or the like.

The system controller (controller) 130 is realized, for example, as a large-scale integrated circuit (LSI) system-on-a-chip (SoC) comprising a plurality of elements integrated into a single chip. The system controller 130 comprises the R/W channel 40, a hard disk controller (HDC) 50, the microprocessor (MPU) 60.

The R/W channel 40 executes signal processing of read data and write data. The R/W channel 40 comprises a circuit or a function to measure signal quality of read data.

The HDC 50 controls data transmission between the host 100 and the R/W channel 40 based on an instruction from the MPU 60. The HOC 50 comprises a host interface circuit connected to the host 100.

The MPU 60 is a main controller configured to control various units of the magnetic recording device 1. The MPU 60 controls the VCM 14 via the driver IC 20 and executes servo control to determine the position of the head 15. Further, the MPU 60 controls processing of writing data to the disk 10 and also controls processing of selecting a storage destination for write data transmitted from the host 100. The write processing executed under the control of the MPU 60 includes operations in the shingled magnetic recording. The MPU 60 comprises a read/write controller 61 and a position detector 62. Note that the MPU 60 executes the processing of the units on firmware.

The read/write controller 61 controls read processing and write processing based on a command from the host 100. The read/write controller 61 writes write tracks by controlling the write head 15W and writing data to the disk 10. In the shingled magnetic recording, the read/write controller 61 overwrites a particular number of write tracks in band region BAn. The read/write controller 61 provides a guard region (or a gap) between adjacent band regions (for example, between band region BAn and a band region BAn+1 [not shown] radially adjacent to band region BAn) to prevent overwriting of data or the like. Further, the read/write controller 61 controls the read head 15R and reads data from read tracks.

Figure 5:
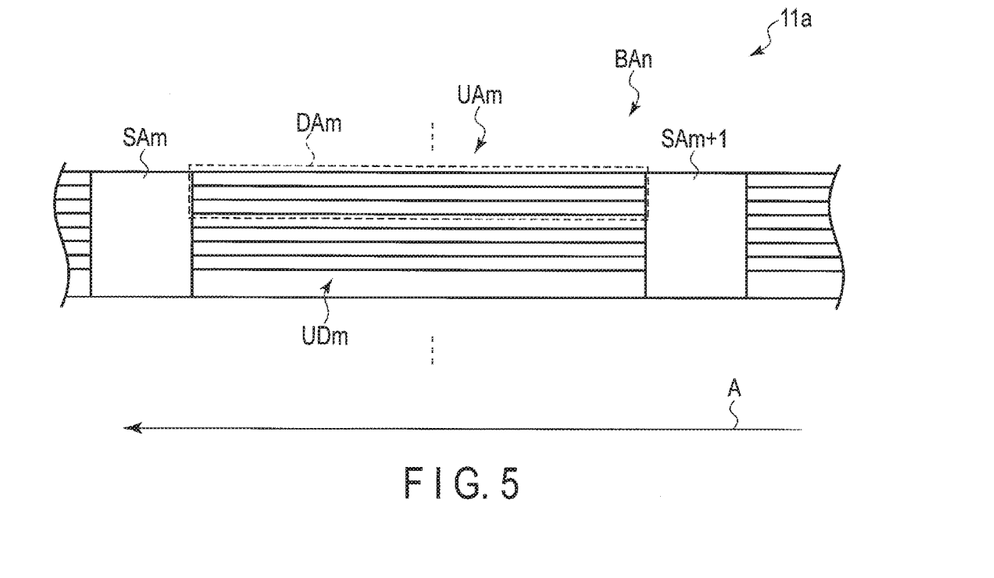
FIG. 5 is a schematic diagram showing a particular user region in the band region of the magnetic disk.
Figure 6:
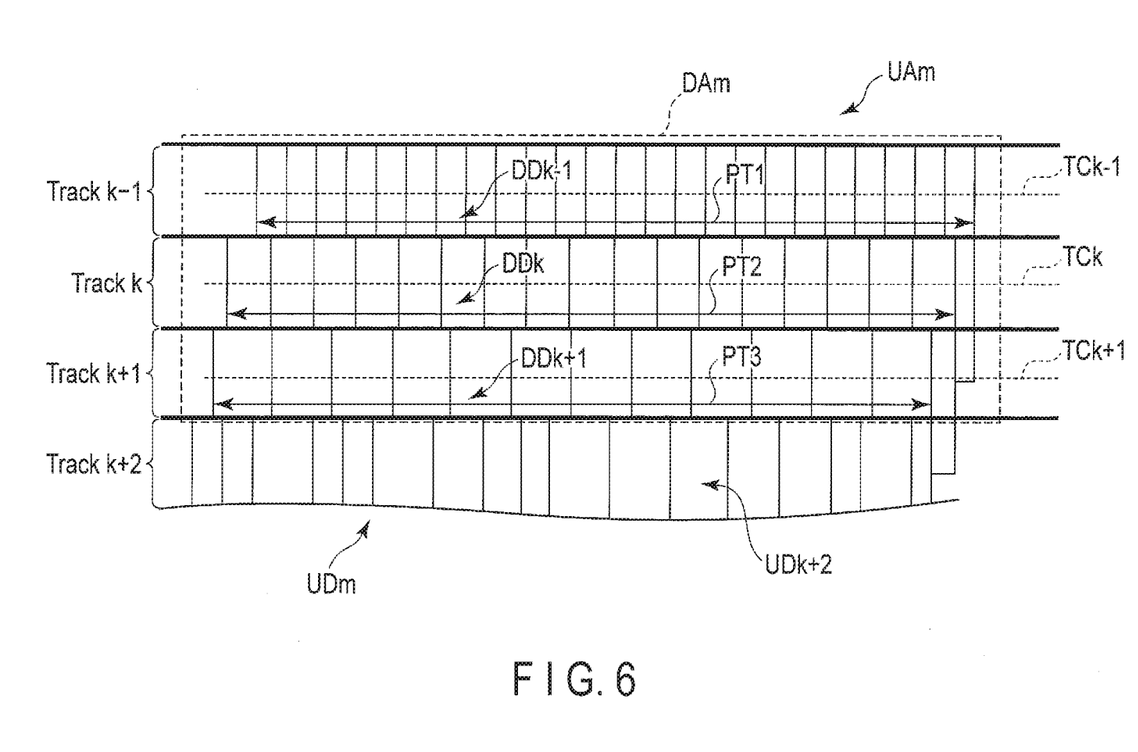
FIG. 6 is an enlarged view of a track including a detection region of the user region of FIG. 5.

FIG. 5 is a schematic diagram showing a particular user region. UAm in band region BAn of the disk 10, and FIG. 6 is an enlarged view of the track including the detection region DAm of the particular user region UAm of FIG. 5. In FIG. 5, the rotation direction A corresponds to the direction A of FIG. 2.

As shown in FIG. 5, band region BAn comprises the particular user region. UAm, and servo regions SAm and SAm+1 located before and after the user region UAm. The particular user region UAm comprises an offset detection region (hereinafter, a detection region) DAm and a user data region UDm. It is possible by reading the detection region DAm to detect an offset to the center track of a read track (hereinafter referred to simply as an offset). Here, it is possible to improve the detection accuracy of an offset by increasing the detection region DAm. User data region UDm is a region other than the detection region DAm in the user region UAm. In user data region UDm, user data is written. Servo region SAm includes servo data corresponding to the user region UAm. Further, servo region SAm+1 includes servo data corresponding to the next user region, namely, a user region UAm+1 adjacent to the user region DAm in the direction opposite to the direction A of the circumferential directions.

The detection region DAm is preferably provided at the beginning or at the end of the user region UAm so that the detection region DAm will not split the user region UAm. Note that the detection region DAm may also be inserted in the user region DAm in such a manner as to split user data region UDm.

Further, the detection region DAm may be provided in one portion of band region. BAn or may be provided in a plurality of portions of band region. BAn. For example, the detection region DAm may be provided at every rotation angle of 90 degrees about the center of the disk 10, that is, in four portions of band region BAn.

In FIG. 6, a track k−1 includes a detection data region DDk−1, a track k includes a detection data region DDk, a track k+1 includes a detection data region DDk+1, and a track k+2 includes a detection data region UDk+2. Here, the detection region DAm is a region including detection data region. DDk−1, detection data region DDk and detection data region DDk+1. Further, in FIG. 6, track k−1 has a track center TCk−1, track k has a track center TCk, and track k+1 has a track center TCk+1.

In the detection region DAm, detection data PT1 is written in detection data region DDk−1, detection data PT2 is written in detection data region DDk, and detection data PT3 is written in detection data region DDk+1. In the user region UAm, user data is written in a region other than the detection region DAm. For example, user data is written in user data region UDk+2.

The read/write controller 61 provides the detect ion region DAm in the particular user region UAm. For example, the read/write controller 61 sets a plurality of radially continuous tracks as the detection region DAm in the particular user region UAm. For example, the read/write controller 61 sets at least two continuous tracks as the detection region DAm in the user region UAm. Further, the read/write controller 61 writes user data in a region other than the detection region DAm in the particular user region UAm. Note that the detection region DAm may be set in advance at the time of manufacturing.

The read/write controller 61 stores position data of the detection region DAm in a recording medium, for example, in the nonvolatile memory 80. The read/write controller 61 detects the detection region DAm from band region BAn with reference to the position data of the detection region DAm and the servo data.

The read/write controller 61 writes detection data to be used for detection of an offset of the head 15 in the detection region DAm. The detection data is, for example, data showing a single frequency (single pattern) signal waveform (hereinafter, single frequency data). When a plurality of continuous tracks are set as the detection region DAm, the read/write controller 61 writes single frequency data, the single frequencies of which are relatively prime to each other, in the respective tracks of the detection region DAm. For example, the single frequency data is data consisting of a pattern of 1, 0, 1, 0, 1, . . . .

For example, as shown in FIG. 6, when the detection region. DAm is continuously radially set across track k−1, track k and track k+1, the read/write controller 61 writes detection data PT1 in detection data region DDk−1, detection data PT2 in detection data region DDk, and detection data PT3 in detection data region DDk+1. Detection data PT1, PT2 and PT3 is single frequency data, the frequencies of the signal waveforms of which are relatively prime to each other. Here, the frequencies of the signal waveforms of detection data PT1, PT2 and PT3 may be assigned with values obtained by dividing a reference or maximum frequency f in the write processing by relative prime numbers. For example, detection data. PT1 may have a single frequency of f/2, detection data PT2 may have a single frequency of f/3, and detection data PT3 may have a single frequency of f/5. Note that the detection data written in the particular detection region DAm may be of any frequencies as long as adjacent tracks are assigned with frequencies different from each other. For example, write detection data of two different frequencies may be alternately written in the continuous tracks of the detection region DAm.

Figure 7:
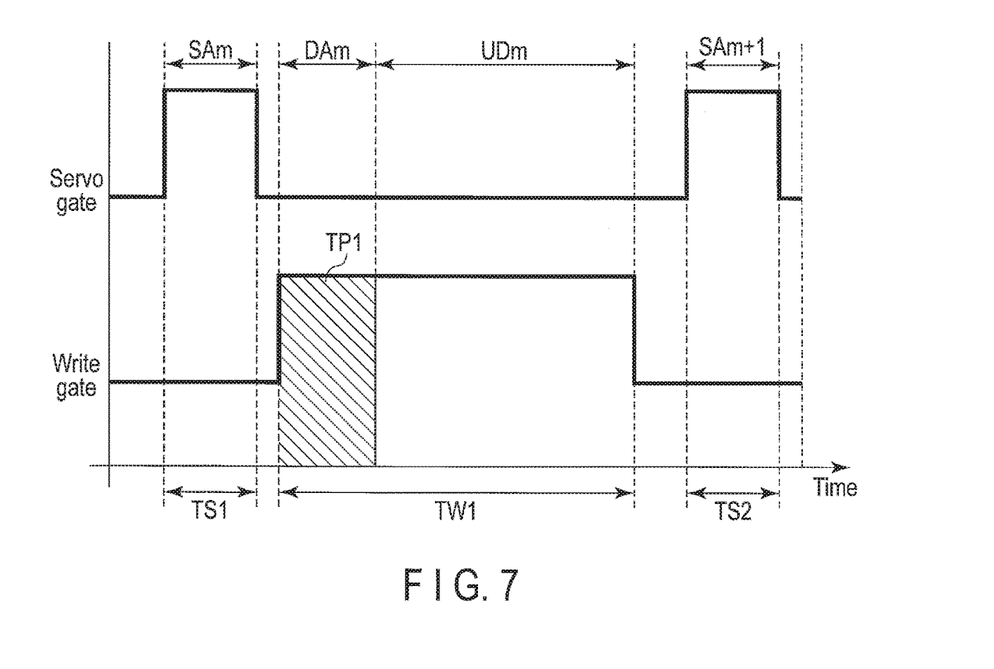
FIG. 7 is an example of a timing chart of writing detection data.

FIG. 7 is an example of a timing chart of writing detection data PT1, PT2 and PT3.

As shown in FIG. 7, the read/write controller 61 reads the servo data in servo region SAm in a time TS1 when a servo gate signal is set to the on state, and determines the position of the head 15 with reference to the read servo data. The read/write controller 61 then writes data in the user region DAm by means of the shingled magnetic recording method in a time TW1 when a write gate signal is set to the on state. For example, as shown in FIG. 7, the read/write controller 61 write detection data PT1, PT2 and PT3 in detection data regions DDk−1, DDk and DDk+1, respectively, in a first time TP1 of the time TW1. The read/write controller 61 writes user data in user data region UDm in a second time of the time TW1 (TW1-TP1) after the first time TP1 of writing detection data PT1 to PT3. Then, the read/write controller 61 reads the servo data from a servo region corresponding to the next band region, namely, servo region SAm+1 in a time TS2 when the servo gate signal is set to the on state, and determines the position of the head 15 with reference to the read servo data.

Before reading user data region UDm with reference to the servo data in servo region SAm, the read/write controller 61 reads at least one of detection data PT1 to PT3 from the detection region DAm. The read/write controller 61 outputs data, read from the detection region DAm to the position detector 62, which will be described later. In read processing, the read/write controller 61 controls the position of the head 15 with reference to data received from the position detector 62.

The position detector 62 detects an off-track position of the read head 15R in a particular read track of the detection region DAm with reference to a reproduced waveform of the data read from a particular position of the detection region DAm (hereinafter referred to simply as a reproduced waveform) and off-track position data.

The off-track position data includes data showing the relationship in each read track of the amplitude of a reproduced waveform to the radial off-track position of the read head 15R. Further, the off-track position data includes data showing the relationship between a fraction representing the ratio of the amplitudes of the signal waveforms of a plurality of frequency components contained in or detected from the reproduced waveform and the off-track position of the read head 15R. The off-track position data is obtained by means of measurement and stored in a recording medium such as the nonvolatile memory 80 before the magnetic recording device 1 is operated.

The position detector 62 analyzes frequency components of a reproduced waveform and executes frequency decomposition processing of a reproduced waveform such as fast Fourier transformation (FFT). The position detector 62 decomposes the frequency of a reproduced waveform into frequency components by executing frequency decomposition processing. The position detector 62 detects an off-track position of the read head 15R with reference to the amplitude of the signal waveform of at least one frequency component obtained by the frequency decomposition processing and the off-track position data, and obtains an offset of the read head 15R from the detected off-track position data.

The offset obtaining process of the position detector 62 will be described with reference to FIGS. 8A, 8B, 8C, 8D and 8E.

Figure 8A:
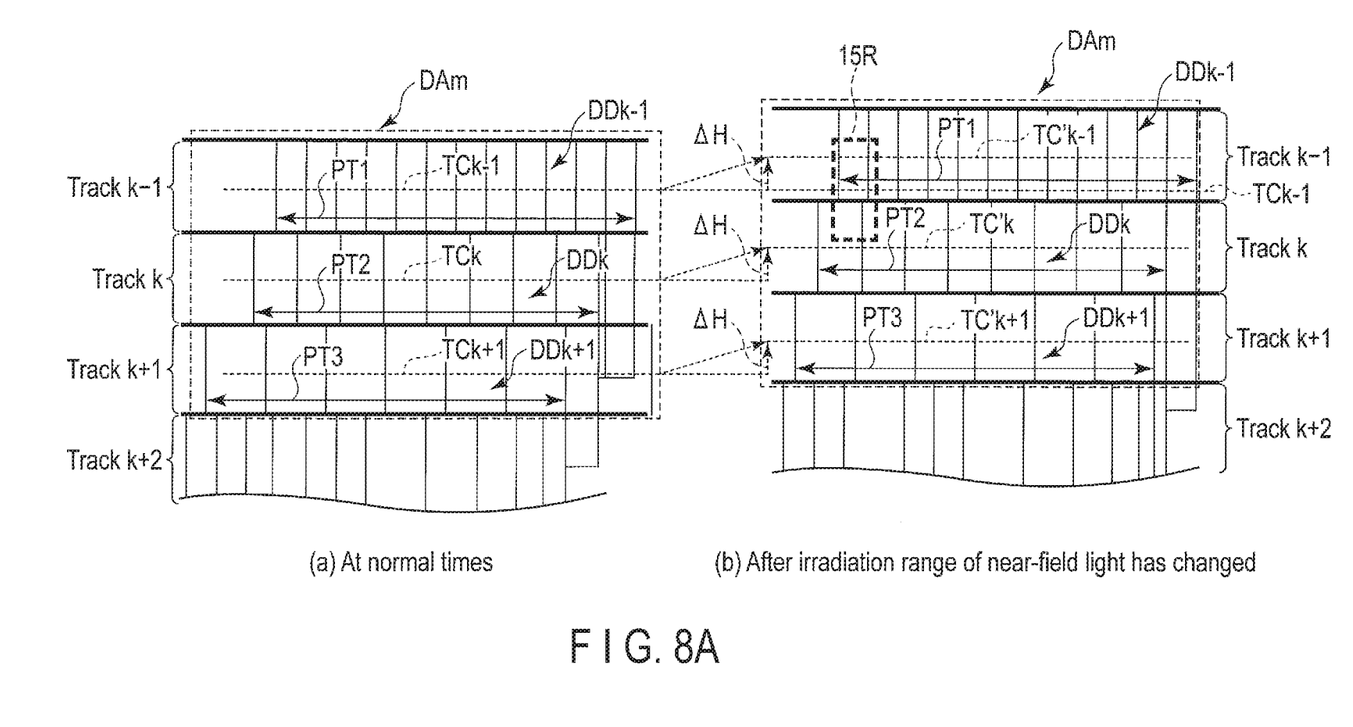
FIG. 8A is a schematic diagram showing a change in the detection region DAm associated with the change in the irradiation range of the near-field light.

FIG. 8A is a schematic diagram showing a change in the detection region DAm associated with a change in the irradiation range of near-field light. In FIG. 8A, the left-hand diagram (a) shows an example of the detection region DAm written when the irradiation range of the near-field light is of normal times, while the right-hand diagram (b) shows an example of the detection region. DAm written after the irradiation range of the near-field light has changed. As shown in the right-hand diagram (b) of FIG. 8A, read track k−1, read track k and read track k+1 written after the irradiation range of the near-field light has changed have track center TC' k−1, track center TC'k and track center TC'k+1, respectively. The change from the left-hand diagram (a) of FIG. 8A to the right-hand diagram (b) of FIG. 8B occurs when the irradiation range of the near-field light increases. Here, changed track centers TC'k−1, TC'k and TC'k+1 are shifted radially by ΔH from normal track centers TCk−1, TCk and TCk+1, respectively. The right-hand diagram (b) of FIG. 8A shows the position of the read head 15R in the changed detection region. DAm determined with reference to the servo data of servo region SAm. Further, the right-hand diagram (b) of FIG. 8A snows normal track center TCk−1 in the changed detection region DAm as the target position of the read head 15R determined with reference to the servo data of servo region SAm.

Figure 8B:
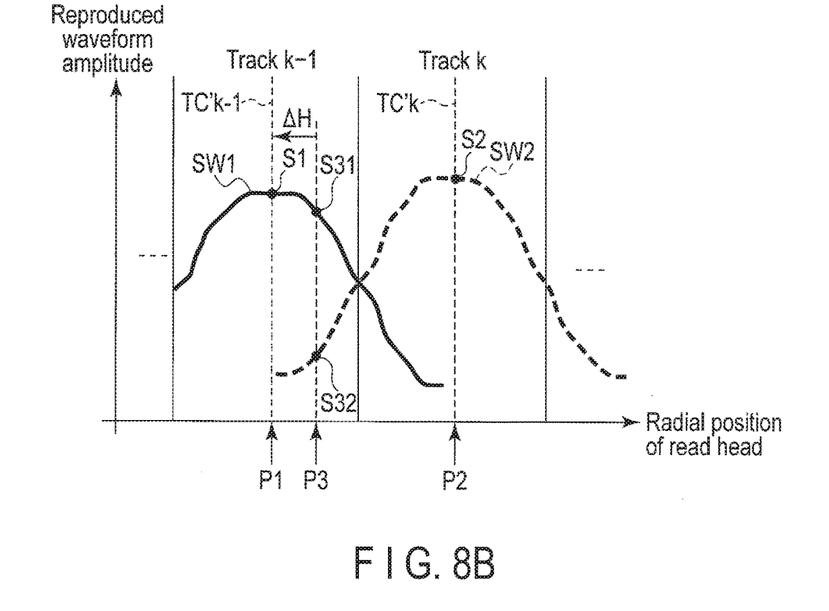
FIG. 8B is a graph showing an example of the relationship between the amplitude of a reproduced waveform and the off-track position of a read head.

FIG. 8B is a graph showing an example of the relationship between the amplitude of the reproduced waveform in the detection region DAm of the right-hand diagram (b) of FIG. BA and the off-track position. In FIG. 8B, the vertical axis represents the amplitude of the reproduced waveform, while the horizontal axis represents the radial position of the read head 15R. A signal profile SW1 shows the relationship between the amplitude of the reproduced waveform of detection data region DDk−1 and the off-track position of the read head 15R, and a signal profile SW2 shows the relationship between the amplitude of the reproduced waveform of detection data region DDk and the off-track position of the read head 15R. A radial position P1 corresponds to track center TC'k−1 of changed read track k−1 shown in the right-hand diagram (b) of FIG. 8A. A radial position. P2 corresponds to track center TC'k of changed read track k shown in the right-hand diagram (b) of FIG. BA. A radial position P3 corresponds to a position shifted by the offset ΔH from track center TC'k−1 of changed track k−1 shown in the right-hand diagram (b) of FIG. BA. That is, radial position P3 is the position of the read head 15R in the changed detection region DAm determined with reference to the servo data of servo region SAm of the normal detection region DAm. A reference symbol S31 indicates the amplitude of signal profile SW1 at radial position P3, and a reference symbol S32 indicates the amplitude of signal profile SW2 at radial position P3. FIG. 8B corresponds to the detection region DAm in the changed particular user region UAm shown in the right-hand diagram (b) of FIG. 8A.

Figure 8C:
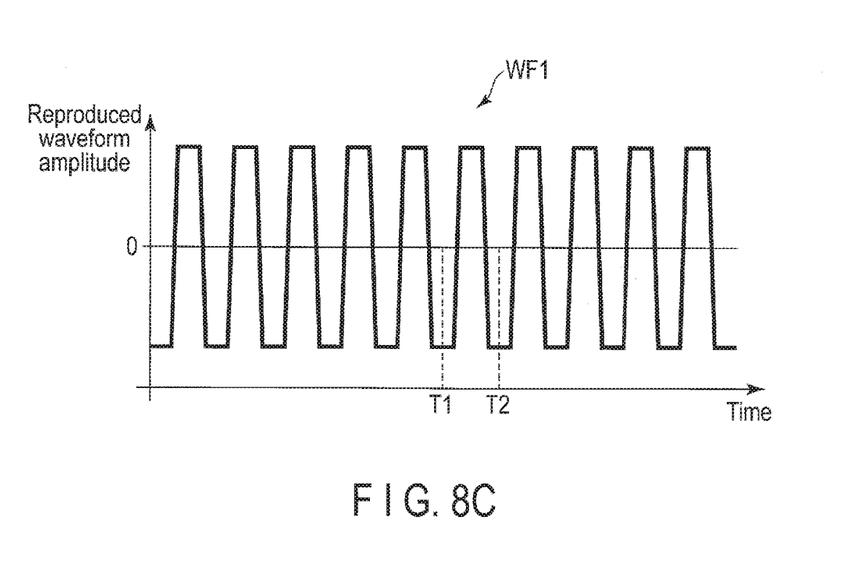
FIG. 8C is a graph showing an example of the relationship between the amplitude of a reproduced waveform and time.
Figure 8D:
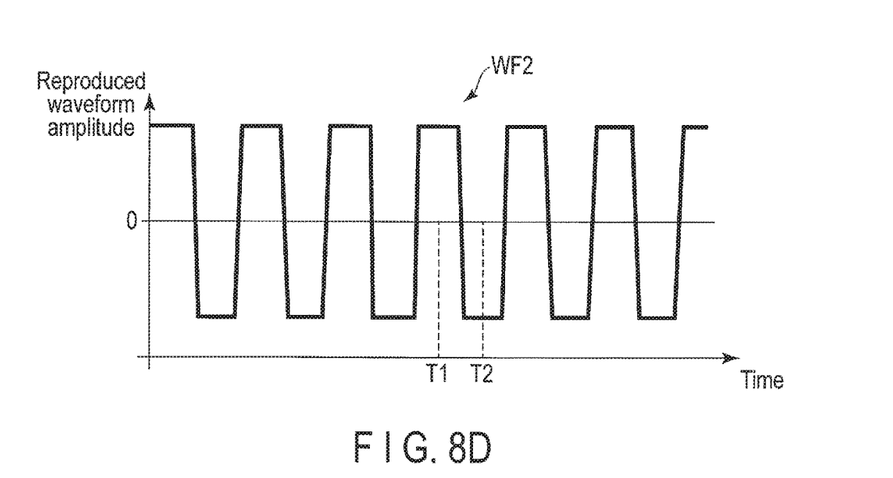
FIG. 8D is a graph showing an example of the relationship between the amplitude of a reproduced waveform and time.
Figure 8E:
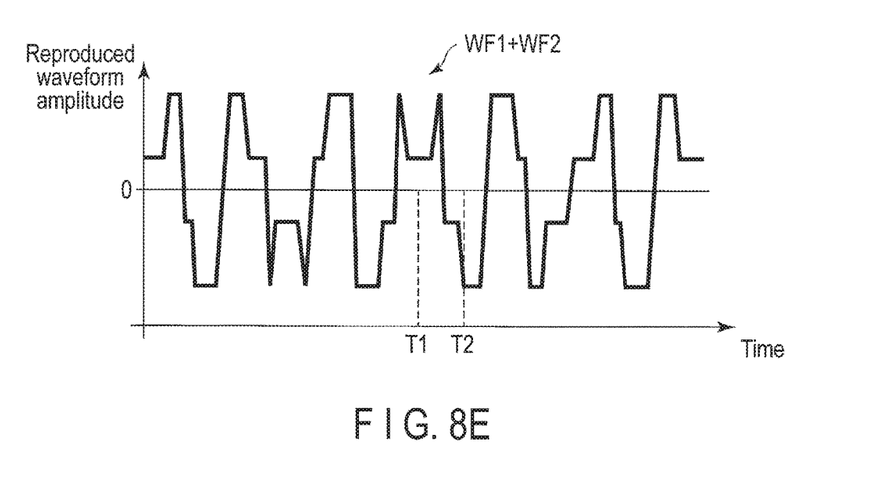
FIG. 8E is a graph showing an example of the relationship between the amplitude of a reproduced waveform and time.

FIGS. 8C, 8D and 8E show examples of the relationship between the amplitude of the reproduced waveform and time. In FIGS. 8C to 8E, the vertical axis represents the amplitude of the reproduced waveform, while the horizontal axis represents time. Further, in FIGS. 8C to 8E, reference symbols T1 and T2 indicate particular times. FIG. 8C shows the relationship between the amplitude of the reproduced waveform at track center TC'k−1 of detection data region DDk−1 corresponding to radial position P1 of FIG. 8B and time, FIG. 8D shows the relationship between the amplitude of the reproduced waveform at track center TC'k of detection data region DDk corresponding to radial position P2 of FIG. 8B and time, and FIG. 8E shows the relationship between the amplitude of the reproduced waveform at a position shifted by the offset. AH from the center track TC'k−1 of detection data region DDk−1 corresponding to radial position P3 and time. FIG. 8C shows a reproduced waveform WF1 read from detection data PT1, FIG. 8D shows a reproduced waveform WF2 read from detection data PT2, and FIG. 8E shows a mixed waveform of reproduced waveform WF1 and reproduced waveform WF2. Reference waveform. WF1 and reference waveform WF2 have different frequencies from each other.

The position detector 62 obtains reproduced waveform. WF1 of detected data PT1 of FIG. 8C when reading detection data region DDk−1 at radial position P1. The position detector 62 analyzes frequency components of reproduced waveform WF1 and executes frequency decomposition processing of reproduced waveform WF1. The position detector 62 obtains amplitude S1 of the signal waveform of the frequency of detection data PT1 by the decomposition processing. The position detector 62 detects with reference to the off-track position data of FIG. 8B and amplitude S1 of the signal waveform that the read head 15R is at radial position P1 of track k−1.

The position detector 62 obtains produced waveform WF2 of detection data PT2 of FIG. 8D when reading detection data region DDk at radial position. P2. The position detector 62 analyzes frequency components of reproduced waveform WF2 and executes frequency decomposition processing of reproduced waveform WF2. The position detector 62 obtains an amplitude S2 of the signal waveform of the frequency of detected data PT2. The position detector 62 detects with reference to signal profile SW1 of FIG. 8B, that is, the off-track position data, and amplitude S2 of the signal waveform that the read head 15R is at radial position P2 of track k.

The position detector 62 obtains a mixed waveform of detection data PT1 and PT2 (WF1+WF2 of FIG. 8E) written in track k−1 and track k adjacent to each other when reading detection data region DDk at radial position P3. The position detector 62 analyzes frequency components of reproduced waveform WF1+WF2 and executes frequency decomposition processing of reproduced waveform WF1+WF2. The position detector 62 obtains a fraction of the amplitudes of a plurality of signal waveforms obtained by the decomposition processing of the mixed waveform, for example, the ratio S31/S32 of the amplitudes of two signal waveforms. The position detector 62 can detect with reference to the off-track position data and the obtained fraction of the amplitudes of a plurality of signal waveforms, for example, the ratio S31/S32 of two signal waveforms that the read head 15R is at radial position P3 of track k−1.

Figure 9:
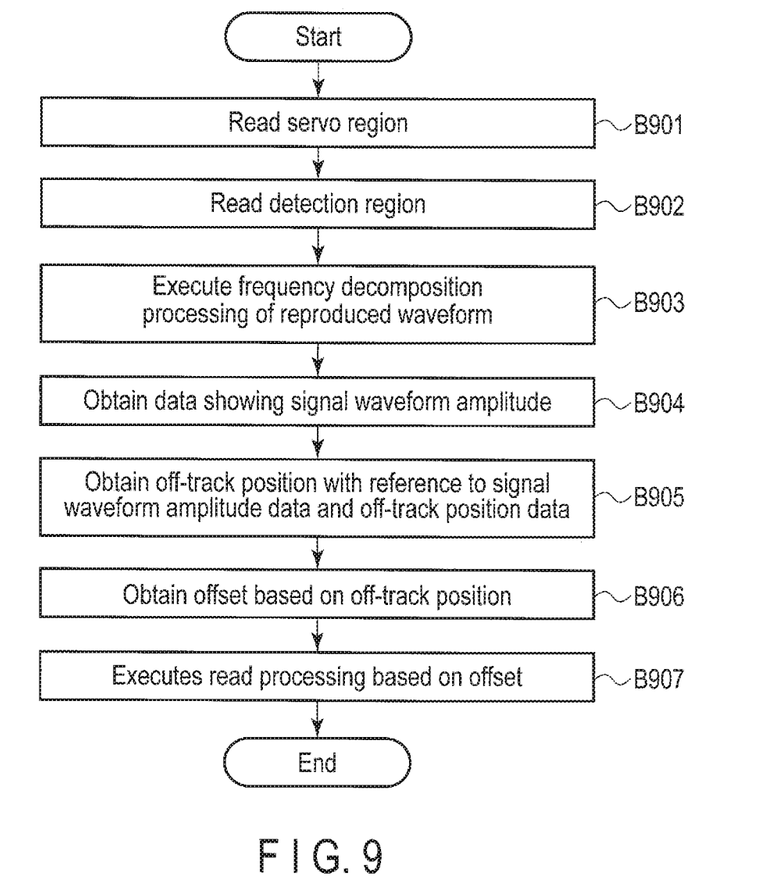
FIG. 9 is a flowchart of read processing.

FIG. 9 is a flowchart of the read processing.

In FIG. 9, detection data is written in each track of the detection region DAm of the particular band region BAn. Detection data written in the respective tracks is single frequency data having frequencies relatively prime to each other.

The MPU 60 reads servo region SAm (B901) and then reads the detection region DAm with reference to the servo data (B902).

The MPU 60 executes the frequency decomposition processing of the reproduced waveform (B903).

The MPU 60 obtains data showing the amplitude of the signal waveform as the result of the frequency decomposition processing (B904).

The MPU 60 obtains the off-track position of the read head 15R with reference to the signal waveform amplitude data and the off-track position data (B905).

The MPU 60 obtains the offset based on the off-track position (B906) and executes the read processing based on the obtained offset (B907).

According to the present embodiment, the magnetic recording device 1 writes, in write processing, a plurality of items of detection data having frequencies different from each other in a plurality of tracks of the detection region DAm of band region BAn. The magnetic recording device 1 reads, in read processing, the detection region DAm and obtains an offset of the head 15 with reference to the amplitude of the signal waveform read from the detection region DAm and the off-track position data.

Therefore, the magnetic recording device 1 can control the read position of the read head 15R based on the offset of the head 15 even when the write track width of the write head 15W changes as the irradiation range of the near-field light changes. Consequently, even when the write track width of the write head 15W changes, the magnetic recording device 1 can still accurately read a target read track in band region BAn. A high-density thermally assisted magnetic recording device can be realized in this way.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording device comprising:
   a disk comprising a band of tracks including a servo region, a first track, and a second track partially overlapping with the first track;
   a light irradiator configured to irradiate the disk with light and heat the disk with the light;
   a head comprising a write head configured to write data in a range of the disk irradiated and heated with the light from the light irradiator, and a read head configured to read data from a track in the band of tracks of the disk; and
   a controller configured to write first data to be used for offset detection in a first region of the band of tracks, read the first data from the first region with reference to servo data in the servo region, detect an offset of the read head based on an amplitude of a first signal of the read first data, and control a position of the read head based on the offset,
   wherein the controller analyzes the frequency components of the first signal of the first data read from a particular position of the first region, the first signal including a second signal and a third signal having a frequency different from that of the second signal, decomposes the first signal into a second frequency component of the second signal and a third frequency component of the third signal, and detects the offset based on a second amplitude of the second frequency component and a third amplitude of the third frequency component.

2. The magnetic recording device of claim 1, wherein the controller detects the offset with reference to a fraction of the second amplitude and the third amplitude and data showing a relationship in each track of an off-track position of the read head to the fraction.

3. The magnetic recording device of claim 1, wherein the second frequency component and the third frequency component are signal frequencies relatively prime to each other.

4. A reading method applicable to a magnetic recording device comprising a disk including a band of tracks including a servo region, a first track, and a second track partially overlapping with the first track, a light irradiator configured to irradiate the disk with light and heat the disk with the light, a head including a write head configured to write data in a range of the disk irradiated and heated with the light from the light irradiator and a read head configured to read data from a track of the band of tracks of the disk, the method comprising:
   writing first data to be used for offset detection in a first region of the band of tracks;
   reading the first data from the first region with reference to servo data in the servo region;
   detecting an offset of the read head based on an amplitude of a first signal of the read first data;
   controlling a position of the read head based on the offset;
   analyzing the frequency components of the first signal of the first data read from a particular position of the first region, the first signal including a second signal and a third signal having a frequency different from that of the second signal, and decomposing the first signal into a second frequency component of the second signal and a third frequency component of the third signal; and
   detecting the offset based on a second amplitude of the second frequency component and a third amplitude of the third frequency component.

5. The reading method of claim 4, further comprising:
   detecting the offset with reference to a fraction of the second amplitude and the third amplitude and data showing a relationship in each track of an off-track position of the read head to the fraction.

6. The reading method of claim 4, wherein the second frequency component and the third frequency component are signal frequencies relatively prime to each other.

* * * * *